(12) United States Patent
Morrison et al.

(10) Patent No.: US 7,622,091 B2
(45) Date of Patent: Nov. 24, 2009

(54) METHODS AND SYSTEMS FOR REDUCING $NO_x$ EMISSIONS IN INDUSTRIAL COMBUSTION SYSTEMS

(75) Inventors: Donald Keith Morrison, Clinton, OH (US); William Theodore Lipinski, Canton, OH (US); Donald Keith Hartsock, Wadsworth, OH (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 11/657,501

(22) Filed: Jan. 24, 2007

(65) Prior Publication Data
US 2008/0175774 A1     Jul. 24, 2008

(51) Int. Cl.
B01D 53/56     (2006.01)
B01D 53/74     (2006.01)
B01D 53/76     (2006.01)

(52) U.S. Cl. .................. 423/210; 423/235; 423/239.1; 422/168; 422/177; 422/180

(58) Field of Classification Search ................ 423/210, 423/235, 239.1; 422/167, 177, 180
See application file for complete search history.

(56) References Cited

U.S. PATENT DOCUMENTS

| | | | | |
|---|---|---|---|---|
| 4,119,702 A | * | 10/1978 | Azuhata et al. | 423/235 |
| 4,751,065 A | * | 6/1988 | Bowers | 423/235 |
| 4,777,024 A | * | 10/1988 | Epperly et al. | 423/235 |
| 4,849,192 A | * | 7/1989 | Lyon | 423/235 |
| 5,045,292 A | * | 9/1991 | Ruegg et al. | 423/235 |
| 5,057,293 A | * | 10/1991 | Epperly et al. | 423/235 |
| 5,058,514 A | * | 10/1991 | Mozes et al. | 110/345 |
| 5,165,903 A | * | 11/1992 | Hunt et al. | 423/239.1 |
| 5,478,542 A | * | 12/1995 | Chawla et al. | 423/235 |
| 5,755,194 A | | 5/1998 | Moorman et al. | |
| 6,280,695 B1 | | 8/2001 | Lissianski et al. | |
| 6,474,271 B1 | | 11/2002 | Widmer et al. | |
| 7,090,810 B2 | * | 8/2006 | Sun et al. | 423/235 |
| 7,361,319 B2 | * | 4/2008 | Vierheilig | 423/213.2 |

* cited by examiner

Primary Examiner—Timothy C Vanoy
(74) Attorney, Agent, or Firm—Armstrong Teasdale LLP

(57) ABSTRACT

A method for operating a combustion system to facilitate reducing emissions from the system is provided. The method includes supplying an aqueous selective reducing agent from an aqueous selective reducing agent source to an atomizer that is directly coupled in flow communication with the aqueous selective reducing agent source. The method also includes atomizing the selective reducing agent in the atomizer, and injecting atomized droplets of the selective reducing agent from the atomizer directly into a transport stream of flue gas flowing within a temperature zone defined within the combustion system.

20 Claims, 4 Drawing Sheets

METHODS AND SYSTEMS FOR REDUCING $NO_x$ EMISSIONS IN INDUSTRIAL COMBUSTION SYSTEMS

BACKGROUND OF THE INVENTION

This invention relates generally to industrial combustion systems, and more particularly to methods and systems for reducing $NO_x$ in industrial combustion systems.

During the combustion of natural gas and pulverized coal, nitrogen oxides ("$NO_x$") emissions are formed by the oxidation of nitrogen in combustion air that is under high temperatures. At least some known $NO_x$ emission sources include devices such as, but not limited to, industrial boilers and furnaces, larger utility boilers and furnaces, gas turbine engines, steam generators, and other combustion systems. Because of stringent emission control standards, it is desirable to control $NO_x$ emissions by either suppressing $NO_x$ formation and/or by reducing $NO_x$ to molecular nitrogen ("$N_2$") and water ("$H_2O$").

At least some known combustion systems attempt to reduce $NO_x$ emissions from a furnace/boiler in at least the following stages: (1) before combustion—using pre-combustion control technologies, (2) during combustion—using combustion modification control technologies that modify the combustion process so that the combustion process produces less $NO_x$, and/or (3) after combustion—using post-combustion control technologies that inject a selective reagent such as, but not limited to, ammonia ("$NH_3$"), urea, and/or similar reducing agents, into the combustion flue gas to facilitate reducing $NO_x$ emissions.

Before combustion, at least some known pre-combustion control technologies burn low nitrogen fuels to facilitate reducing $NO_x$ emissions. However, generally pre-combustion technologies may be limited in reducing $NO_x$ emissions because air containing $N_2$ is used to burn the low nitrogen fuel, and as such, oxidation of the $N_2$ in the air may occur during combustion to form additional $NO_x$ emissions.

During combustion, at least some known combustion modification control technologies may reduce $NO_x$ by attempting to: (1) lower the temperature in a main combustion zone to suppress formation of $NO_x$, (2) decrease the oxygen concentration in high temperature zones by supplying only enough oxygen to oxidize the fuel, but not enough to form $NO_x$ and carbon monoxide ("CO") emissions, and/or (3) create conditions under which $NO_x$ can be reduced to $N_2$ through reacting with hydrocarbon fragments. However, generally combustion modification control technologies include limited $NO_x$ emissions reduction, stringent operating tolerances, and limited residence times to complete combustion.

After combustion, at least some known post-combustion control technologies such as, but not limited to, Selective Catalytic Reduction ("SCR") and Selective Non-Catalytic Reduction ("SNCR") may be used to selectively reduce $NO_x$ emissions. In combustion systems using SCR technology, $NO_x$ is selectively reduced by injecting a nitrogenous reducing agent ("N-agent") such as, $NH_3$ or urea, into the furnace/boiler in the presence of at least one catalyst. Although the SCR system significantly reduces $NO_x$ more efficiently than known combustion modification control technologies, known SCR systems require a large catalyst bed, large amounts of catalysts, and catalysts disposal systems, all of which may be more difficult and more expensive to operate than combustion modification systems.

In combustion systems using SNCR technology, an N-agent is injected into the combustion flue gas at a high temperature. Under a non-catalytic reaction, the $NO_x$ formed during combustion may be reduced to $N_2$ through a reaction with the N-agent. Although the SNCR system significantly reduces $NO_x$ more efficiently than known combustion modification control technologies, known SNCR systems reduce $NO_x$ less efficiently than the SCR systems. On the other hand, the SNCR system is generally less expensive than the SCR system, but more expensive than combustion modification systems. Moreover, although known SCR and SNCR systems reduce $NO_x$ more efficiently than combustion modification systems, both the SCR and SNCR systems include additional components that increase the overall costs, complexity, "foot print" (space in plant occupied by emissions control systems that could be devoted to production) and maintenance in comparison to known combustion modification control technologies.

BRIEF DESCRIPTION OF THE INVENTION

In one aspect, a method for operating a combustion system to facilitate reducing emissions from the system is provided. The method includes supplying an aqueous selective reducing agent from an aqueous selective reducing agent source to an atomizer that is directly coupled in flow communication with the aqueous selective reducing agent source. The method also includes atomizing the selective reducing agent in the atomizer, and injecting atomized droplets of the selective reducing agent from the atomizer directly into a transport stream of flue gas flowing within a temperature zone defined within the combustion system.

In another aspect, a combustion system to facilitate reducing emissions is provided. The combustion system includes an aqueous selective reducing agent source for supplying an aqueous selective reducing agent, and an atomizer directly coupled in flow communication with the aqueous selective reducing agent source. The atomizer receives and atomizes the selective reducing agent that is supplied from the aqueous selective reducing agent source. The combustion system also includes a temperature zone defined within the combustion system. The atomizer directly injects atomized droplets of the selective reducing agent into a transport stream of flue gas flowing within the temperature zone.

In another aspect, a reagent injection system to facilitate reducing emissions from a combustion system is provided. The reagent injection system includes an aqueous selective reducing agent source for supplying an aqueous selective reducing agent, and an atomizer directly coupled in flow communication with the aqueous selective reducing agent source. The atomizer receives and atomizes the selective reducing agent that is supplied from the aqueous selective reducing agent source, and injects atomized droplets of the selective reducing agent from the atomizer directly into a transport stream of flue gas flowing within a temperature zone defined within the combustion system.

DETAILED DESCRIPTION OF THE INVENTION

The exemplary methods and systems described herein overcome the structural disadvantages of known Selective Catalytic Reduction (SCR) and Selective Non-Catalytic Reduction (SNCR) systems by reducing the number of components coupled within each respective system.

It should be appreciated that the term "SCR system" is used throughout this application to refer to a combustion system implementing a Selective Catalytic Reduction (SCR) control technology that injects a reagent to facilitate selectively reducing nitrogen oxides ("$NO_x$") emissions.

It should be appreciated that the term "SNCR system" is used throughout this application to refer to a combustion system implementing a Selective Non-Catalytic Reduction (SNCR) control technology that injects a reagent to facilitate selectively reducing $NO_x$ emissions.

Figure 1:
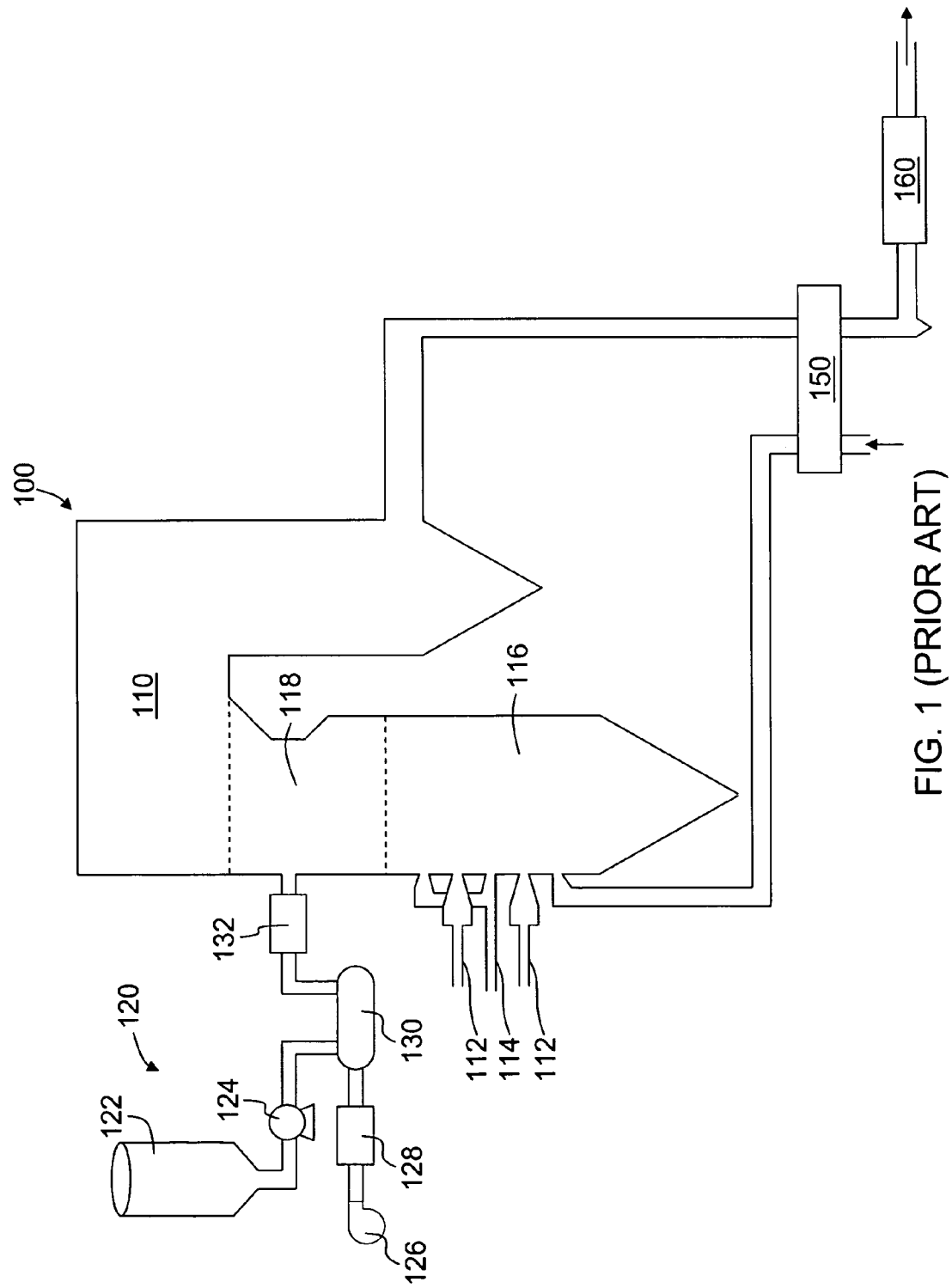
FIG. 1 is a schematic diagram of an exemplary known Selective Non-Catalytic Reduction (SNCR) injection system.

FIG. 1 illustrates a schematic diagram of a known SNCR system 100. In the exemplary embodiment, SNCR system 100 includes a furnace/boiler 110, a reagent injection system 120, an air preheater 150, and optionally, other pollution control devices 160. Furnace/boiler 110 serves as a combustion chamber that includes fuel injection ports 112, air injection ports 114, a combustion zone 116, and a temperature zone 118 which is at an optimum SNCR temperature range of approximately 1500 to 2100° F., more specifically, approximately 1600 to 2000° F., and all subranges therebetween depending on the reagent injected into the flue gas in SNCR system 100. In the exemplary embodiment, at least one fuel injection port 112 and at least one air injection port 114 are coupled to furnace/boiler 110 to inject fuel and air, respectively, into combustion zone 116. After combustion of the fuel, a generated combustion exhaust gas, also known as a combustion flue gas, flows in a transport stream into furnace/boiler temperature zone 118.

The reagent injection system 120 includes a reagent storage device 122 that is an aqueous selective reducing agent source, a pump 124, a blower 126, an air heater 128, a vaporizer 130, and a mixer 132. The reagent storage device 122 stores an aqueous reagent such as, but not limited to, ammonia ("$NH_3$"), urea, and/or similar nitrogenous reducing agents ("N-agents") that may be pumped out by pump 124 to vaporizer 130. Blower 126 blows air into air heater 128 to heat air that is used to vaporize the reagent in vaporizer 130. Subsequently air, reagent, and water vapors are premixed in mixer 132 to form a premixed gas prior to entry into furnace/boiler temperature zone 118.

After entering temperature zone 118, the premixed gas reacts with flue gas to facilitate reducing $NO_x$. Any remaining flue gas then travels through air preheater 150, which heats secondary air to facilitate heating air supplied to furnace/boiler 110 for combustion. After flowing through air preheater 150, flue gas may optionally travel through other pollution control devices 160 prior to being discharged to ambient. Such pollution control devices 160 may include devices such as, but are not limited to devices including, sulfur oxides ("$SO_x$") control devices, particulate control devices, filtering devices, and/or similar emissions control devices.

Figure 2:
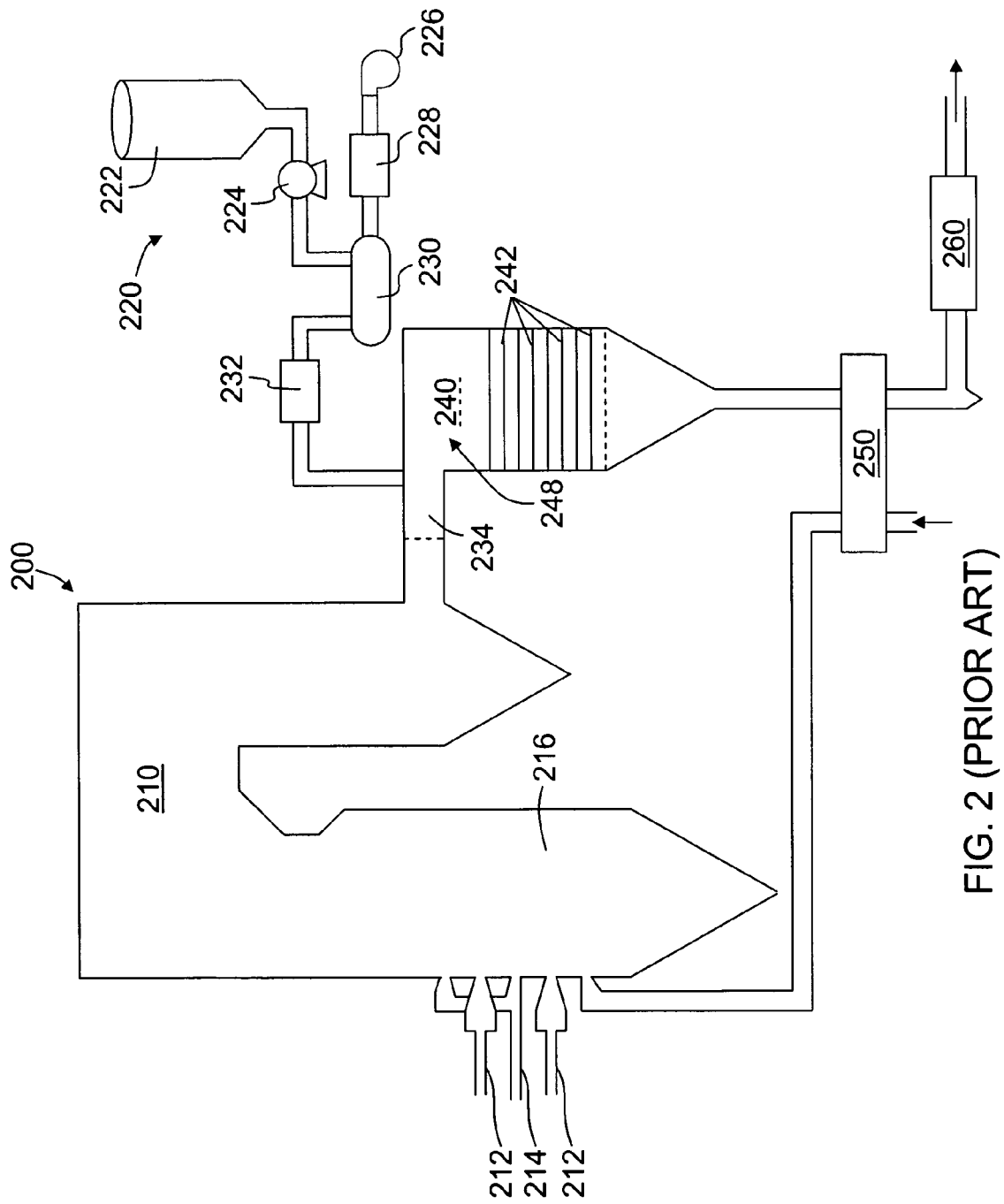
FIG. 2 is a schematic diagram of an exemplary known Selective Catalytic Reduction (SCR) injection system.

FIG. 2 illustrates a schematic diagram of a known SCR system 200. In the exemplary embodiment, the SCR system 200 includes a furnace/boiler 210, a reagent injection system 220, an SCR reactor 240, an air preheater 250, and optionally, other pollution control devices 260. Furnace/boiler 210 serves as a combustion chamber that includes fuel injection ports 212, air injection ports 214, and a combustion zone 216. In the exemplary embodiment, at least one fuel injection port 212 and at least one air injection port 214 are coupled to furnace/boiler 210 to inject fuel and air, respectively, into combustion zone 216. After combustion of the fuel, a generated flue gas flows in a transport stream to SCR reactor 240. SCR reactor 240 includes a temperature zone 248 which is at an optimum SCR temperature range of approximately 450 to 840° F., more specifically, approximately 500 to 750° F., and all subranges therebetween depending on the reagent and the catalyst used in SCR system 200.

The reagent injection system 220 includes a reagent storage device 222, a pump 224, a blower 226, an air heater 228, a vaporizer 230, and a mixer 232. Reagent storage device 222 stores an aqueous reagent such as, but not limited to, $NH_3$, urea, and/or similar N-agents that may be pumped out by pump 224 to vaporizer 230. Blower 226 blows air into air heater 228 to heat air that is used to vaporize the reagent in vaporizer 230. Subsequently air, reagent, and water vapors are premixed in mixer 232 to form a premixed gas. The premixed gas may be injected into the transport stream of flue gas that is located in a duct 234 positioned upstream of SCR reactor 240.

In the exemplary embodiment, the SCR reactor 240, includes a catalyst bank 242 having one or more layers of catalyst for treatment. On the surface of catalyst bank 242, the premixed gas reacts with flue gas in temperature zone 248 of SCR system 200 to selectively reduce $NO_x$ by forming harmless byproducts such as, nitrogen ("$N_2$") and water ("$H_2O$"). Any remaining flue gas is channeled through air preheater 250 to facilitate heating air supplied to furnace/boiler 210 for combustion.

Flue gas may optionally travel through other pollution control devices 260 prior to being discharge to ambient. Such pollution control devices 260 may include devices such as, but are not limited to devices including, $SO_x$ control devices, particulate control devices, filtering devices, and similar emissions control devices.

Known SNCR and SCR systems include additional components such as, but are not limited to components including, an air heater, a vaporizer, and a mixer to introduce a reagent into a combustion flue gas. Such components at least partially define a flow/travel path of the reagent introduced to the system. Because of the length of travel path in such systems, a reaction time for reducing $NO_x$ may be delayed from a time that the reagent is introduced to the system. As a result, a droplet size and timed release of the reagent must be calculated to ensure a chemical reaction occurs between the reagent and the flue gas to facilitate reducing $NO_x$ contained therein. Therefore, such components increase equipment size, materials, complexity, maintenance, and cost of each known system.

Figure 3:
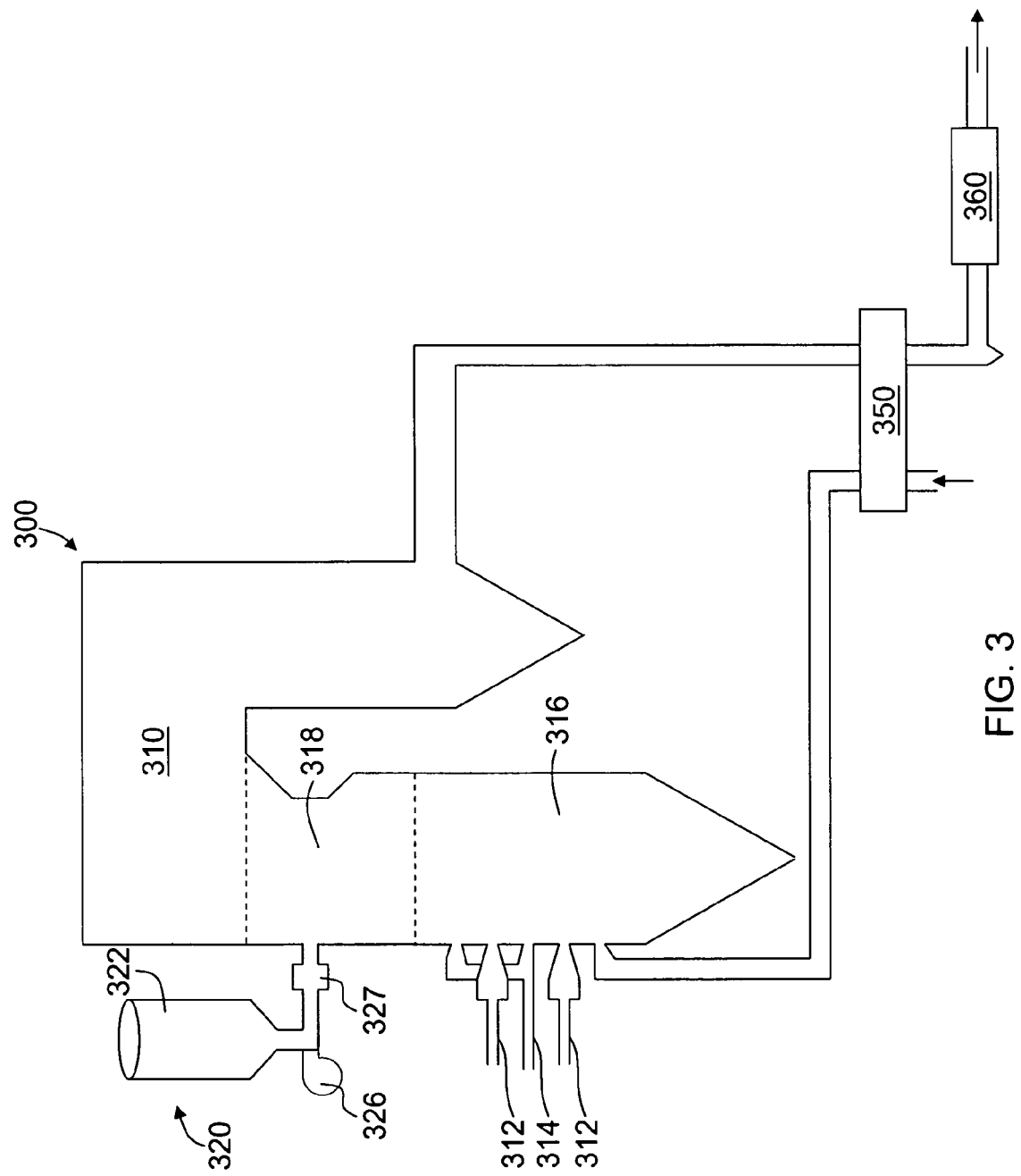
FIG. 3 is a schematic diagram of an exemplary SNCR injection system.

FIG. 3 illustrates a schematic diagram of an exemplary Selective Non-Catalytic Reduction (SNCR) system 300. SNCR system 300 includes a furnace/boiler 310, a reagent injection system 320, an air preheater 350, and optionally, other pollution control devices 360. Furnace/boiler 310 serves as a combustion chamber that includes fuel injection ports 312, air injection ports 314, a combustion zone 316, and a temperature zone 318, which in the exemplary embodiment has an optimum SNCR temperature range of approximately 1500 to 2100° F., more specifically, 1600 to 2000° F., and all subranges therebetween depending on the reagent injected into the flue gas in SNCR system 300. Specifically, in the exemplary embodiment, such temperature range facilitates optimizing the reaction between the reagent and the flue gas.

At least one fuel injection port 312 and at least one air injection port 314 are operatively coupled to furnace/boiler 310 to inject fuel and air, respectively, into combustion zone 316. After combustion of the fuel, a generated flue gas flows in a transport stream into temperature zone 318.

The reagent injection system 320 is different from known reagent injection systems, such as reagent injection system 120 (shown in FIG. 1). Specifically, reagent injection system 320 includes a reagent storage device 322, an optional blower 326, and an atomizer 327. Unlike known SNCR reagent injection systems, such as reagent injection system 120, reagent injection system 320 does not include an air heater, a vaporizer, or a mixer nor any component which functions to replace such components.

In the exemplary embodiment, reagent storage device 322 stores an aqueous reagent such as, but not limited to, $NH_3$, urea, and/or similar N-agents, and is directly coupled in flow communication to atomizer 327. Although the reagent has been described as including $NH_3$, urea, and/or similar N-agents, it should be appreciated that the reagent may include any aqueous reducing agent, known or later developed, that selectively reduces $NO_x$. Optionally, the reagent may be forced out to atomizer 327 via blower 326. Although SNCR reagent injection system 320 has been described as including optional blower 326, it should be appreciated that blower 326 may be optionally replaced with a pump or any other device, known or later developed, which facilitates channeling reagent to furnace/boiler 310 as described herein. Subsequently, atomizer 327 may directly inject particles of a reagent/air mixture into temperature zone 318.

After entering temperature zone 318, the reagent/air mixture reacts with flue gas to facilitate reducing $NO_x$. Any remaining flue gas is forced through air preheater 350 to facilitate heating air supplied to furnace/boiler 310 for combustion. After flowing through air preheater 350, flue gas may optionally travel through other pollution control devices 360 prior to being discharged to ambient. Such pollution control devices 360 may include devices such as, but are not limited to devices including, $SO_x$ control devices, particulate control devices, filtering devices, and/or similar emissions control devices.

During operation of SNCR system 300, in the exemplary embodiment, an aqueous selective reducing agent ("reagent") may be stored in reagent storage device 322. The reagent may be channeled through atomizer 327 that is directly coupled in flow communication with reagent storage device 322. Atomizer 327 atomizes the reagent into fine droplets and injects the droplets into the combustion flue gas in furnace/boiler temperature zone 318. In the exemplary embodiment, temperature zone 318 has an optimum SNCR temperature range of approximately 1500 to 2100° F., more specifically, approximately 1600 to 2000° F., and all subranges therebetween depending on the reagent injected into the flue gas in SNCR system 300.

In the exemplary embodiment, the SNCR reagent injection system 320 includes atomizer 327 directly coupled in flow communication with reagent storage device 322 to introduce a reagent into a combustion flue gas to facilitate reducing $NO_x$. More specifically, in the exemplary embodiment, an air heater, a vaporizer, and a mixer of known SNCR reagent injection systems, such as reagent injection system 120, are excluded from SNCR system 300. As such, an overall size of SNCR system 300 is smaller than known SNCR systems, such as SNCR system 100. More specifically, in SNCR system 300, a flow/travel path of a reagent introduced to the system is shorter than a flow/travel path of the known SNCR systems.

Because of the shorter length of the reagent flow/travel path in SNCR system 300, a reaction time for reducing $NO_x$ is increased compared to the known SNCR systems. As a result, a size reduction of an initial reagent droplet prior to entry in a flue gas in SNCR system 300 is substantially less than a size reduction of an initial reagent droplet prior to entry in a flue gas in known SCR systems. Therefore, in SNCR system 300, a reagent droplet size upon entry in the flue is substantially similar to an initial droplet size. As such, in SNCR system 300, less complex calculations are required to determine reagent droplet size upon entry and timed release of the reagent compared to known SNCR systems, such as SNCR system 100, to ensure a chemical reaction occurs between the reagent and flue gas to facilitate reducing $NO_x$ contained therein. Therefore, the overall SNCR system 300 facilitates reducing equipment size, material, complexity, maintenance, and cost as compared to known SNCR systems.

Figure 4:
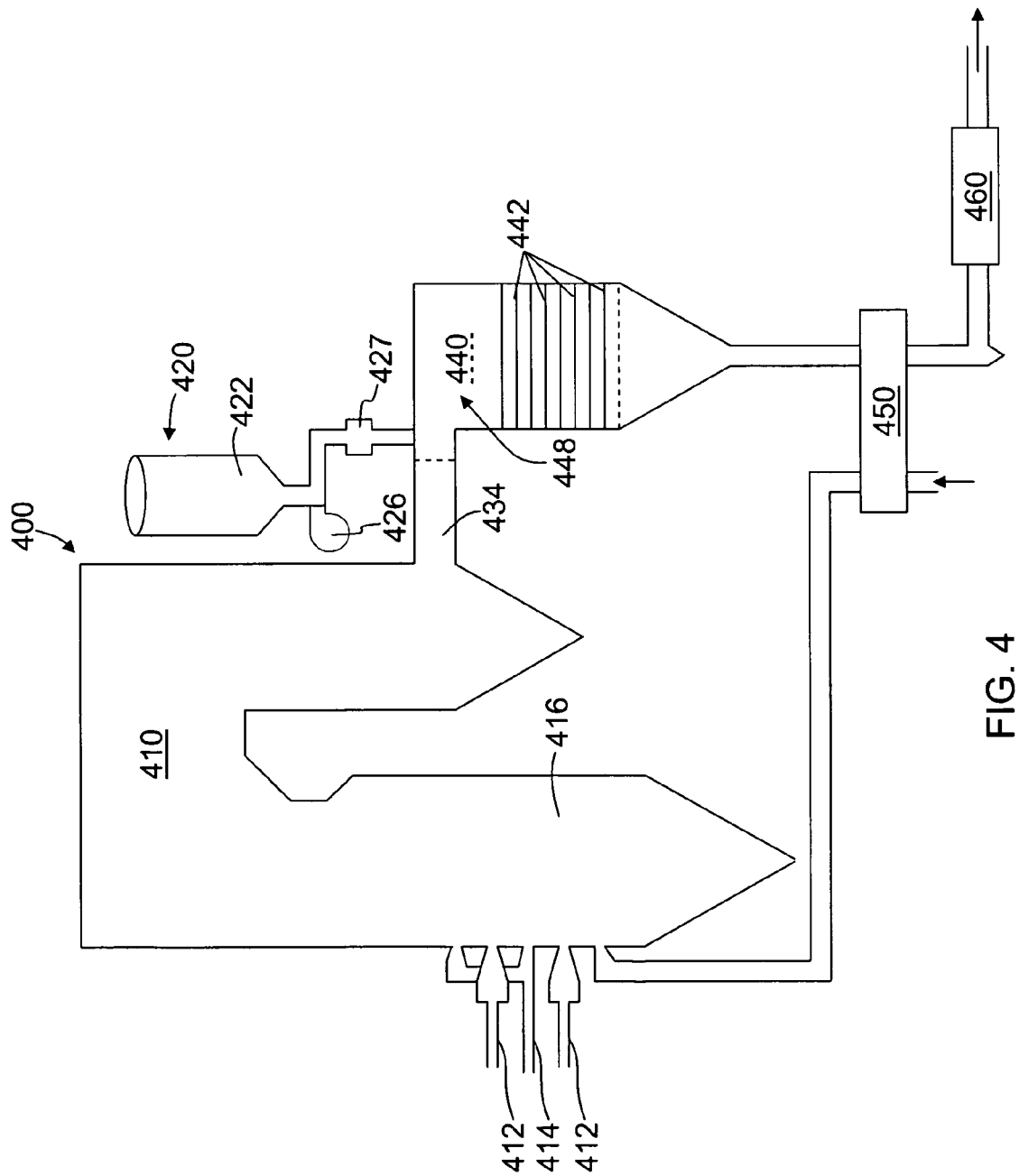
FIG. 4 is a schematic diagram of an exemplary SCR injection system.

FIG. 4 illustrates a schematic diagram of an exemplary Selective Catalytic Reduction (SCR) system 400. In the exemplary embodiment, SCR system 400 includes a furnace/boiler 410, a reagent injection system 420, a SCR reactor 440, an air preheater 450, and other pollution control devices 460. Furnace/boiler 410 serves as a combustion chamber that includes fuel injection ports 412, air injection ports 414, and a combustion zone 416 At least one fuel injection port 412 and at least one air injection port 414 are coupled to furnace/boiler 410 to inject fuel and air, respectively, into combustion zone 416. After combustion of the fuel, a generated flue gas flows in a transport stream to a temperature zone 448 which has an optimum SCR temperature range of approximately 450 to 840° F., more specifically, approximately 500 to 750° F., and all subranges therebetween depending on the reagent and the catalyst used in SCR system 400.

The reagent injection system 420 is different from known reagent injection system, such as reagent injection system 220 (shown in FIG. 2). Specifically, in the exemplary embodiment, reagent injection system 420 includes a reagent storage device 422, an optional blower 426, and an atomizer 427. Unlike known SCR reagent injection systems, such as reagent injection system 220, reagent injection system 420 does not include an air heater, a vaporizer, or a mixer.

In the exemplary embodiment, the reagent storage device 422 stores an aqueous reagent such as, but not limited to, $NH_3$, urea, and/or similar N-agents, and is directly coupled in flow communication to the atomizer 427. Although the reagent has been described as including $NH_3$, urea, and/or similar N-agents, it should be appreciated that the reagent may include any aqueous reducing agent, known or later developed, that selectively reduces $NO_x$. Optionally, the reagent may be forced into atomizer 427 via blower 426. Although the SCR reagent injection system 420 has been described as including optional blower 426, it should be appreciated that blower 326 may be optionally replaced with a pump or any other device, known or later developed, which facilitates channeling reagent to furnace/boiler 410 as described herein. Subsequently, atomizer 427 may directly inject particles of a reagent/air mixture into the transport stream of flue gas via a duct 434 positioned upstream of SCR reactor 440.

In the exemplary embodiment, SCR reactor 440 includes a catalyst bank 442 having one or more layers of catalyst to facilitate treatment. Specifically, in the exemplary embodiment, the reagent/air mixture reacts with flue gas across a surface of catalyst bank 442 in temperature zone 448 of SCR system 400 to selectively reduce $NO_x$ by forming harmless byproducts such as, $H_2O$ and $N_2$. Any remaining flue gas is channeled through air preheater 450 to facilitate heating air supplied to furnace/boiler 410 for combustion.

After flowing through air preheater 450, flue gas may optionally travel through other pollution control devices 460 prior to being discharged to ambient. Such pollution control devices 460 include devices such as, but are not limited to devices including, $SO_x$ control devices, particulate control devices, filtering devices, and/or similar emissions control devices.

During operation of SCR system 400, in the exemplary embodiment, an aqueous selective reducing agent ("reagent") may be stored in reagent storage device 422. The selective reducing agent may be channeled through atomizer 427 that is directly coupled in flow communication with reagent storage device 422. Atomizer 427 atomizes the reagent into fine droplets and injects the droplets into a transport stream of combustion flue gas.

In the exemplary embodiment, the reagent is injected upstream of SCR reactor 440. Specifically, the reagent is injected into furnace/boiler temperature zone 448. In the exemplary embodiment, temperature zone 448 has an optimum SCR temperature range of approximately 450 to 840° F., more specifically, approximately 500 to 750° F., and all subranges therebetween depending on the reagent injected into the flue gas in SCR system 400. Although the reagent has been described as being injected into the transport stream of flue gas via a duct 434, it should be appreciated that the reagent may be injected into any portion of SCR system 400 wherein the transport stream of the flue gas is within the desired SCR temperature range.

In the exemplary embodiment, the SCR reagent injection system 420 includes atomizer 427 directly coupled in flow communication with reagent storage device 422 to introduce a reagent into a combustion flue gas to facilitate reducing $NO_x$. More specifically, in the exemplary embodiment, an air heater, a vaporizer, and a mixer of known SCR reagent injection systems, such as reagent injection system 220, are excluded from SCR system 400. As such, an overall size of SCR system 400 is smaller than known SCR systems, such as SCR system 200. More specifically, in SCR system 400, a flow/travel path of a reagent introduced to the system is shorter than a flow/travel path of the known SCR systems.

Because of the shorter length of the reagent flow/travel path in SCR system 400, a reaction time for reducing $NO_x$ is increased compared to the known SCR systems. As a result, a size reduction of an initial reagent droplet prior to entry in a flue gas in SCR system 400 is substantially less than a size reduction of an initial reagent droplet prior to entry in a flue gas in known SCR systems. Therefore, in SNCR system 400, a reagent droplet size upon entry is substantially similar to an initial droplet size. As such, in SCR system 400, less complex calculation are required to determine reagent droplet size and timed release of the reagent compared to known SCR systems, such as SCR system 200, to ensure a chemical reaction occurs between the reagent and flue gas to facilitate reducing $NO_x$ contained therein. Therefore, the overall SCR system 400 facilitates reducing equipment size, material, complexity, maintenance, and cost as compared to known SCR systems.

For both SNCR system 300 and SCR system 400, the effectiveness of $NO_x$ reduction depends on an optimal temperature at an area of injection of reagent into a transport stream of flue gas in each respective system 300 and 400. For example, if the reagent is injected into the transport stream where the temperature is too low, then ammonia slip emissions may occur. In contrast, if reagent is injected into the transport stream where the temperature is too high, then oxidation of nitrogen in the reagent may occur to produce additional $NO_x$. Therefore, in SNCR system 300 and SCR system 400, reagent is injected into respective temperature zones 318 and 448 each having optimum temperature ranges to facilitate reducing $NO_x$.

The effectiveness of $NO_x$ reduction also depends on the size of droplets of reagent injected into the transport stream of the flue gas. For example, if the droplet size of the reagent is too large when the droplet enters into the transport stream, the reagent may not fully react with $NO_x$ in the flue gas. Moreover, if the droplets are larger in size, the larger droplets generally take longer to evaporate to a smaller droplet size that facilitates a chemical reaction with the $NO_x$ contained in the flue gas. Further, the size of the droplets is selected depending on the application. For example, larger droplet may be less suitable for injection into a smaller industrial furnace/boiler that utilizes a smaller resonance time for the droplet to travel as compared to a larger utility furnace/boiler that utilizes a larger resonance time for the droplet to travel.

In contrast, for example, if the droplets are smaller in size, the smaller droplets generally take less time to evaporate. Moreover, if the droplet size of the reagent is too small when the droplet enters into the transport stream, the reagent may not fully react with $NO_x$ in the flue gas. For example, such droplet size may be inadequate to facilitate a chemical reaction with the $NO_x$ contained in the flue gas due to a substantial evaporation of the droplet. Further, as discussed above, the size of the droplets is selected depending on the application. For example, a substantially smaller initially injected N-agent droplet may be less suitable for injection into smaller industrial furnaces/boilers that utilizes a smaller resonance time for the droplet to travel as compared a larger industrial furnace/boiler that utilizes a larger resonance time for the droplet to travel.

In the exemplary SNCR and SCR systems 300 and 400, reagent droplets are injected with air into the respective temperature zones 318 and 448. Compared to larger utility furnaces/boilers, the smaller industrial SNCR and SCR systems 300 and 400 act to release fine reagent droplets closely coupled to a reagent injection port so that the droplets may react sooner with the flue gas to reduce $NO_x$. Therefore, the air heater, the vaporizer, and the mixer of the known SCR and SNCR systems, such as SNCR and SCR systems 100 and 200 (shown in FIGS. 1 and 2), may be eliminated in the exemplary SNCR and SCR systems of the present application. As a result, the exemplary SNCR and SCR systems of the present application streamline SNCR and SCR systems design and facilitate more cost-effective systems by reducing capital and utility costs for smaller industrial combustion systems.

In the exemplary SNCR and SCR systems of the present application, the above-described systems each include a reagent injection system having an atomizer directly coupled in flow communication with a reagent storage device to facilitate reducing $NO_x$. As a result, each reagent injection system facilitates reducing a number of system components, such as an air heater, a vaporizer, and a mixer. Moreover, a flow/travel path of a reagent introduced to each system is shorter than a flow/travel path of known SNCR and SCR systems. Therefore, the reduced number of system components and reduce flow/travel path length facilitate reducing equipment size, material, complexity, maintenance, and cost.

Exemplary embodiments of reagent injection systems are describe in detail above. The reagent injection systems are not limited to use with the specific SNCR and SCR systems described herein, but rather, the reagent injection systems can be utilized independently and separately from other system components described herein. Moreover, the invention is not limited to the embodiments of the reagent injection systems described above in detail. Rather, other variations of the reagent injection systems may be utilized within the spirit and scope of the claims.

While the invention has been described in terms of various specific embodiments, those skilled in the art will recognize that the invention can be practiced with modification within the spirit and scope of the claims.

What is claimed is:

1. A method for operating a combustion system to facilitate reducing emissions from the system, said method comprising:
supplying an aqueous selective reducing agent from an aqueous selective reducing agent source to an atomizer coupled in direct flow communication to the aqueous selective reducing agent source;
atomizing the selective reducing agent in the atomizer; and
injecting atomized droplets of the selective reducing agent from the atomizer directly into a transport stream of flue gas flowing within a temperature zone defined within the combustion system, and wherein the aqueous selective reducing agent discharged from the aqueous selective reducing agent source is channeled only to the atomizer prior to being injected into the temperature zone, wherein a blower coupled to the atomizer and to the aqueous selective reducing agent source forces the selective reducing agent from the aqueous selective reducing agent source to the atomizer.

2. A method according to claim 1 further comprising coupling the atomizer directly to a combustion chamber of the combustion system defining the temperature zone.

3. A method according to claim 1 further comprising injecting atomized droplets of the selective reducing agent into the temperature zone that is at a temperature range of between approximately 1500 to 2100° F.

4. A method according to claim 1 further comprising injecting atomized droplets of the selective reducing agent into the temperature zone that is at a temperature range of between approximately 1600 to 2000° F.

5. A method according to claim 1 further comprising accelerating a chemical reaction of the selective reducing agent and the flue gas.

6. A method according to claim 5 further comprising providing a catalytic reactor comprising at least one catalyst bank.

7. A method according to claim 6 further comprising injecting droplets of the selective reducing agent upstream of the catalytic reactor.

8. A method according to claim 6 further comprising injecting atomized droplets of the selective reducing agent into the temperature zone that is at a temperature range of between approximately 450 to 840° F.

9. A method according to claim 6 further comprising injecting atomized droplets of the selective reducing agent into the temperature zone that is at a temperature range of between approximately 500 to 750° F.

10. A combustion system to facilitate reducing emissions, said combustion system comprising:
an aqueous selective reducing agent source for supplying an aqueous selective reducing agent;
an atomizer coupled in direct flow communication to said aqueous selective reducing agent source, said atomizer receives and atomizes the selective reducing agent that is supplied from said aqueous selective reducing agent source;
a temperature zone defined within said combustion system, wherein said atomizer directly injects atomized droplets of the selective reducing agent into a transport stream of flue gas flowing within said temperature zone, wherein the selective reducing agent discharged from said aqueous selective reducing agent source is channeled only to said atomizer prior to being injected into said temperature zone; and
a blower coupled to said atomizer and to said aqueous selective reducing agent source for forcing the selective reducing agent from said aqueous selective reducing agent source toward said atomizer.

11. A combustion system according to claim 10 wherein said temperature zone is defined within a combustion chamber of said combustion system, and wherein said atomizer is directly coupled in flow communication with said combustion chamber.

12. A combustion system according to claim 10 wherein said temperature zone is at a temperature range of between approximately 1500 to 2100° F.

13. A combustion system according to claim 10 wherein said temperature zone that is at a temperature range of between approximately 1600 to 2000° F.

14. A combustion system according to claim 10 wherein said temperature zone is partially defined within a duct of said combustion system, and wherein said atomizer is directly coupled in flow communication with said duct.

15. A combustion system according to claim 10 further comprising a catalytic reactor comprising at least one catalyst bank for accelerating a chemical reaction of the selective reducing agent and the flue gas, said catalytic reactor being coupled to a combustion chamber.

16. A combustion system according to claim 15 wherein said atomizer is coupled upstream of said catalytic reactor to inject droplets of the selective reducing agent.

17. A combustion system according to claim 15 wherein said temperature zone is at a temperature range of between approximately 450 to 840° F.

18. A combustion system according to claim 15 wherein said temperature zone is at a temperature range of between approximately 500 to 750° F.

19. A reagent injection system to facilitate reducing emissions from a combustion system, said reagent injection system comprising:
an aqueous selective reducing agent source for supplying an aqueous selective reducing agent;
an atomizer coupled in direct flow communication to said aqueous selective reducing agent source, said atomizer receiving and atomizing the selective reducing agent that is supplied from said aqueous selective reducing agent source, said atomizer injecting atomized droplets of the selective reducing agent from said atomizer directly into a transport stream of flue gas flowing within a temperature zone defined within said combustion system, wherein the aqueous selective reducing agent discharged from said aqueous selective reducing agent source is channeled only to said atomizer prior to being injected into said temperature zone; and
a blower coupled to said atomizer and to said aqueous selective reducing agent source for forcing the selective reducing agent from said aqueous selective reducing agent source towards said atomizer.

20. A reagent injection system according to claim 19 wherein said temperature zone is partially defined within at least one of a combustion chamber of said combustion system and a duct of said combustion system.

* * * * *